United States Patent [19]

Cussler et al.

[11] Patent Number: 5,160,627
[45] Date of Patent: Nov. 3, 1992

[54] PROCESS FOR MAKING MICROPOROUS MEMBRANES HAVING GEL-FILLED PORES, AND SEPARATIONS METHODS USING SUCH MEMBRANES

[75] Inventors: Edward L. Cussler, Edina, Minn.; Gunilla E. Gillberg-LaForce, Summit; Michael J. Sansone, Berkeley Heights, both of N.J.; David K. Schisla, St. Louis, Mo.

[73] Assignee: Hoechst Celanese Corporation, Somerville, N.J.

[21] Appl. No.: 815,297

[22] Filed: Dec. 27, 1991

Related U.S. Application Data

[63] Continuation of Ser. No. 727,330, Jul. 3, 1991, abandoned, which is a continuation of Ser. No. 599,494, Oct. 17, 1990, abandoned.

[51] Int. Cl.$^5$ .............................. E01D 67/00
[52] U.S. Cl. .................... 210/639; 264/DIG. 48; 264/DIG. 62
[58] Field of Search .......... 264/41, 45.1, 48, DIG. 48, 264/DIG. 62; 210/639

[56] References Cited

U.S. PATENT DOCUMENTS

| | | |
|---|---|---|
| 3,335,545 | 8/1967 | Robb et al. |
| 4,113,912 | 9/1978 | Okita |
| 4,405,688 | 9/1983 | Lowery et al. |
| 4,451,981 | 6/1984 | Kaniarz |
| 4,541,981 | 6/1984 | Lowery |
| 4,789,468 | 12/1988 | Sirkar |
| 4,957,620 | 9/1990 | Cussler |
| 4,994,189 | 2/1991 | Leighton et al. ............ 210/637 |

FOREIGN PATENT DOCUMENTS

| | | |
|---|---|---|
| 69869 | 7/1981 | European Pat. Off. |
| 257635 | 8/1987 | European Pat. Off. |
| 302650 | 7/1988 | European Pat. Off. |
| 8801183 | 5/1988 | Netherlands |

OTHER PUBLICATIONS

Schisla, D., "Hollow Fiber Liquid Chromatography With A Gel Stationary Phase", Center for Interfacial Engineering, Fall Review of the Polymer Microstructure Program, Oct. 16-17, 1989.

Handbook of Fiber Science and Technology: vol. II—Chemical Process of Fibers and Fabrics, Functional Finishes Part A, pp. 23-28, Marcel Dekker Inc., NY 1983.

Ding, H., Yang, M. Schisla, D. and Cussler, E., "Hollow Fiber Liquid Chromatography", AIChE Journal, 35 (5), May 1989, pp. 814-882.

Neplenbroek, A. M. et al, "Stable Supported Liquid Membranes", Proceedings, vol. I, The 1990 International Congress on *Membranes and Membrane Processes*, (North American Membrane Society), pp. 686-688.

*Primary Examiner*—Frank Sever
*Attorney, Agent, or Firm*—K. A. Genoni; J. M. Brown; B. H. Davidson

[57] ABSTRACT

A process is provided for modifying the properties of a hydrophobic microporous membrane which includes the steps of first providing a hydrophobic microporous membrane, treating it with a surfactant to render the membrane hydrophilic, wetting the membrane with an aqueous solution of a polyol such as polyvinyl alcohol (PVA) and divinyl sulfone (DVS) or a precursor thereof, washing the membrane with water to displace the polyol/DVA from the exterior of the membrane while retaining it in the pores of the membrane, and crosslinking the polyol/DVS into an aqueous gel to yield a hydrophilic microporous membrane having pores filled with an aqueous polyol/DVS gel, the exterior of the membrane being unobstructed by gel. The modified membranes produced according to the process are useful in carrying out chromatographic separations.

18 Claims, 2 Drawing Sheets

PROCESS FOR MAKING MICROPOROUS MEMBRANES HAVING GEL-FILLED PORES, AND SEPARATIONS METHODS USING SUCH MEMBRANES

This is a continuation of application Ser. No. 07/727,330 filed Jul. 3, 1991, now abandoned which was a continuation of Ser. No. 07/599,494, filed Oct. 17, 1990, now abandoned.

High performance liquid chromatography is a well known method of separating solute species in dependence upon the differential absorption/desorption between two different solute species. Typically, a liquid carrier (in which the solute species to be separated are present), is passed through a column packed with separation media (e.g., solid or gelled particles). This separation medium, in effect, increases the residence time of one (or more) solute species in the liquid carrier (which is inert to the solute species) relative to one (or more) other solute species in the liquid carrier (i.e., due to the greater rate of absorption/desorption of the one solute species relative to the other solute species). Due to the increased residence time of the one solute species in the column, there will be a time when an essentially pure mixture of carrier liquid and the other solute species will be present at the discharge of the column—that is, the one and the other solute species will be separated.

With the recent advent of commercial manufacture of biological species (e.g. proteins), however, the conventional liquid chromatography technique of using packed particle beds has proven to be an inefficient means of separating one species from another with high purity. This inability of packed particle chromatography columns can be attributed generally to the high pressure drops which are experienced and which lead to lesser flow rates of the liquid carrier through the column (thereby leading to a lesser rate of production of the desired biological species). In addition, the requirements for very stringent control over particle size, the uniformity of the particles and the manner in which such particles fill the column contribute to increased costs which, in general, cannot be tolerated on a commercial scale. Furthermore, particle beds sometimes become plugged or fouled after a number of sample injections. Hence, the conventional packed particle technique for liquid chromatography, while being adequate for analytical purposes on a small scale, is inadequate for separating solute species (particularly biological species) on a commercial scale.

Recently, it has been proposed to employ hollow fibers for liquid chromatography. The geometry of such hollow fibers provides an attractive alternative to particles in terms of lesser pressure drop through the column, and the lower cost of hollow fibers (relative to uniform particles) which provides attractive economies of scale and thus may allow commercially viable liquid chromatography to be achieved. Larger bed volumes can be more easily achieved in the hollow fiber geometry. Adding length to the column does not increase pressure drops with the severity encountered with particle beds—a five meter module has a pressure drop below one pound per square inch. Adding fibers in parallel gives an efficient mobile phase and sample distribution if the fiber diameters are well matched. The hollow fibers allow the advantage of using a low pressure pump, and the wide open conduits of the fibers should plug less easily than particle packing. The low resistance to flow in the fibers will allow for more speedy washing, elution, and regeneration steps for affinity chromatography.

The art has developed in recent years concerning modification of the hollow fiber lumens to improve and expand on the performance of hollow fibers in chromatographic separations.

European Published Patent Application 302,650 discloses a method for converting a hydrophobic polyolefin hollow fiber microporous membrane to a hydrophilic membrane by the grafting of polyvinyl alcohol onto the inner and outer surfaces of a hollow fiber substrate membrane. The method consists of irradiation of the hollow fibers with ionizing radiation, followed by reaction with vinyl acetate and then hydrolysis.

Okita U.S. Pat. No. 4,113,912 teaches that a fluorocarbon microporous membrane, such as polyvinylidene fluoride or polytetrafluoroethylene, can be made hydrophilic by filling the pores with an aqueous solution of a water-soluble polymer, as for example polyacrylic acid, polyacrylamide, or polyvinyl alcohol, and then subjecting the polymer-treated membrane to reagents and conditions that lead to water-insolubilization of the polymer, generally by crosslinking. The resulting membrane is suitable for use in filtration, dialysis, ultrafiltration, and reverse osmosis.

European Published Patent Application 257,635 teaches that hydrophobic membranes, with fluorocarbon membranes used as examples, can be rendered hydrophilic by filling the pores with an aqueous solution containing one or more hydrophilic polyfunctional amine- or hydroxy-containing monomers or polymers, such as water-soluble cellulose derivatives or polyvinyl alcohol, along with crosslinking agents and optional catalysts, surfactants and initiators. These solutions are formulated with the goals of improving penetration of the pores and also of inducing crosslinking to take place or causing the hydrophilic compound to chemically bind as an insoluble coating on the fluorocarbon substrate. The product membranes are useful in ultra- and microfiltration.

SUMMARY OF THE INVENTION

This invention relates to a process for modifying the properties of a hydrophobic microporous membrane which includes the steps of first providing a hydrophobic microporous membrane, treating it with a surfactant to render the membrane hydrophilic, wetting the lumens of the fibers with an aqueous solution of polyvinyl alcohol (PVA) and divinyl sulfone (DVS), washing the lumens with water to displace the PVA/DVS from the lumens while retaining it in the pores, injecting a base to initiate and catalyze the crosslinking of the PVA/DVS into an aqueous gel, and washing out the base, to yield a hydrophilic microporous membrane having pores filled with an aqueous PVA/DVS gel, and having unobstructed lumens.

The advantage of providing an aqueous gel in the membrane pores is that the gelled water can withstand higher pressure gradients without being displaced from the pore structure, compared with the ungelled liquid. The gelling of the water has only minor influence on the diffusion rates of small molecules and/or carriers in the liquid. The liquid (water) becomes the transport medium when the membrane is used for separations. A carrier can also be dissolved in the immobilized water to facilitate transport of molecules being separated in the liquid medium.

The pore-filled membranes may be used broadly in liquid chromatography applications, especially where it is advantageous to employ a hollow fiber membrane which can operate under high pressure drops without bleeding of the gel out of the fiber matrix and where unimpeded diffusion of a liquid mobile phase through the fiber lumens is important. The gel in the pores of the hollow fibers of the invention can be used as a backbone for affinity ligands that selectively bind with proteins, or as a selective hydrophilic environment for separating low molecular weight biological molecules.

It is an object of this invention to provide a stabilized gelled liquid membrane immobilized in the pores of a microporous membrane, which can be used in separations at high pressure without loss of the liquid membrane by rejection from the microporous membrane matrix.

BRIEF DESCRIPTION OF THE DRAWINGS

Reference will be made to the accompanying drawings in which numerals designate elements, and in which.

DESCRIPTION OF THE PREFERRED EMBODIMENTS

Figure 1:
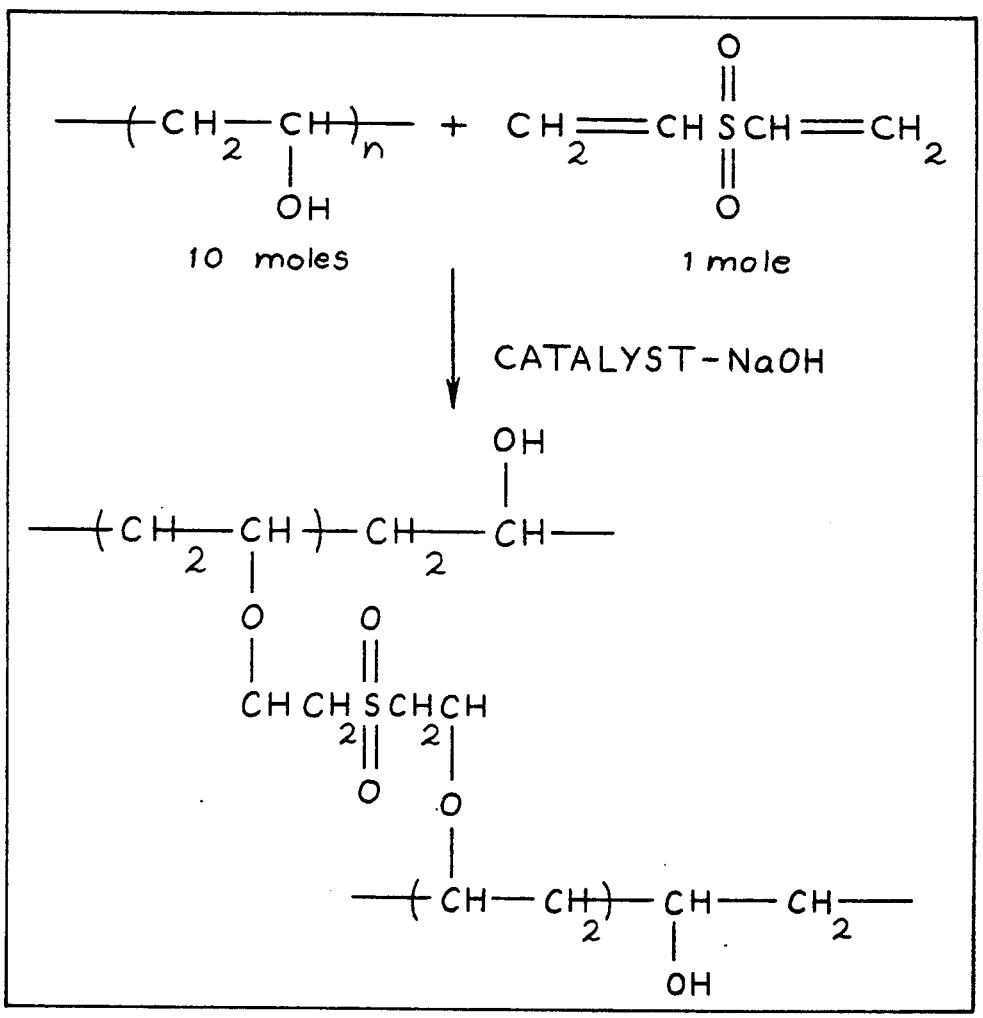
FIG. 1 illustrates the structure of the PVA/DVS gel.

Although any suitable microporous hollow fiber may be employed in the practice of this invention, it is presently preferred to use microporous, normally hydrophobic polyolefin (e.g., polypropylene or polyethylene; polypropylene is most preferred) hollow fibers arranged generally parallel to one another in a closely packed relationship within an outer shell structure.

The hollow fibers employed in this invention may be, for example, those of the type made using the "up-spinning" technique disclosed in U.S. Pat. Nos. 4,405,688 and 4,541,981, each in the name of James J. Lowery et al, and each being expressly incorporated herein by reference. Briefly, non-porous precursor hollow fibers are produced according to the techniques disclosed in these prior patents by melt spinning the precursor fibers in a substantially vertically upward direction (i.e., up-spinning). The thus melt spun precursor hollow fibers are then spin-oriented while subjecting them to a symmetrical quenching step using a hollow annular structure surrounding the precursor fiber which has one or more openings on its inner surface that distribute the quenching medium against the precursor fiber in a substantially uniform manner. The thus formed precursor hollow fiber may then be heat-annealed by, for example, subjecting the non-porous precursor hollow fiber to a temperature of between about 5 degrees centigrade to about 100 degrees centigrade for a time period of at least a few seconds (e.g., from a few seconds up to about 24 hours, preferably between about 30 minutes to about 2 hours).

The finished microporous hollow fibers will possess an average inner diameter in the range of from about 5 to about 1500 microns, and preferably in the range of from about 70 to about 1500 microns. The fibers are, moreover, characterized by a substantially uniform internal diameter (I.D.), for example, a coefficient of variation in inner diameter through a cross-section taken perpendicular to the axis of the fiber of less than about 8%, preferably less than about 5%, and more preferably less than about 3%.

The pores of the preferred microporous hollow fibers are essentially interconnected through tortuous paths which may extend from one exterior surface or surface region to another, i.e., open-celled. Further, the pores of the preferred microporous hollow fibers of the invention are microscopic, i.e., the details of the pore configuration are described only in terms of microscopic dimensions. Thus, the open cells or pores in the fibers are smaller than those which can be measured using an ordinary light microscope, because the wavelength of visible light, which is about 5,000 Angstroms, is longer than the longest planar or surface dimension of the open cell or pore. The pore size of the microporous hollow fibers may be defined by using electron microscopy techniques which are capable of resolving details of pore structure below 5,000 Angstroms or by mercury porosimetry techniques.

The average effective pore size of the microporous hollow fibers useable in the practice of this invention is preferably between about 50 to 2,000 Angstroms, and more typically between 100 to 1,000 Angstroms. By "effective pore size" is meant the smallest dimension of a pore which would allow a generally spherical particle of that same dimension to pass therethrough. The pores generally have an elongated shape with a width of from about 50 to 2,000 Angstroms, and a length of from about 500 to 10,000 Angstroms. Hence, the "average effective pore size" of the preferred microporous hollow fibers will usually be determined by the width dimension of the pores. These pores will, moreover, be fairly uniform around the circumference of the fiber. For example, the preferred microporous hollow fibers will exhibit an average ratio of the maximum pore density to the minimum pore density around the circumference of the fiber of less than about 3:1, and usually less than about 2:1.

Three further criteria for the preferred hollow fibers to be used in chromatographic applications are as follows (1) the fiber wall thickness is preferably less than 20% of the fiber diameter, more preferably less than 10% of the fiber diameter; (2) diffusion in the stationary phase should be reduced no more than a factor of five from the mobile phase; and (3) the diameters of the fibers should be consistent to within 5% variability. It should be recognized, however, that other hollow fibers can be used.

Microporous hollow fibers of the type described above are commercially available from Hoechst Celanese Corporation, Separations Products Division, Charlotte, N.C., under the registered trademark CELGARD.

The microporous hollow fibers are preferably a part of a module having an inlet end and an outlet end. The module includes a number (e.g., from a few hundred to many thousand) hollow fibers of predetermined length arranged substantially parallel to one another within the central space of a generally tubular shell structure (e.g., glass, metal, or plastic tubes). The individual fibers are positionally retained within the outer shell structure by means of suitable potting compounds (e.g., epoxy resins). A particularly preferred epoxy resin is a 2.5:1.0 mixture (by volume) of FE-5045A and FE-5045B, both commercially available from H.B. Fuller, St. Paul, Minn. Modules of this type are commercially available in a wide range of sizes and capacities. For example, one particular microporous hollow fiber module which may be satisfactorily employed in the practice of the present invention is commercially available from the Hoechst Celanese Corporation, Separations Products Division, Catalog No. 50101060. This module has 27,000 CELGARD(R) microporous hollow fibers of 100 micron internal diameter. Other suitable microporous hollow fiber modules may, however, be used for the purposes of this invention.

In preferred embodiments of this invention, hollow fibers are supported in glass tubes ranging from 20 centimeters to 60 centimeters in length, having an outside diameter of 6.0 millimeters and a glass wall thickness of 1.0 millimeter.

A key factor in designing a module for use according to this invention is the expected throughput. The throughput is directly proportional to the lumen volume (and hence, the number and length of fibers), but as the cross-sectional area of the module increases, it becomes increasingly difficult to evenly distribute the mobile phase and sample among the hollow fibers. As the column length increases, the capacity to separate the mobile phase into its component parts increases but at the expense of increased pressure drop. According to preferred embodiments, the column length is kept at a reasonable length and the cross-sectional area relatively large, as the best compromise of these tradeoffs. In this manner, the pressure drop is manageable, and the column does not become cumbersome. In a particularly preferred embodiment, the column length is about 5 meters, and the operating pressure drop is one pound per square inch.

The coating process is generally applicable to any configuration of microporous hollow fibers. Microporous hollow fibers having an inner diameter of both 240 and 100 microns and fiber wall thickness of about 30 microns, for example, have been successfully used. However, for reasons not completely understood, 240 micron hollow fibers give more consistently uniform coatings. Applicants believe that the fiber porosity (40% for the 240 micron fibers and 30% for the 100 micron fibers), and/or the smaller internal diameter of the 100 micron hollow fibers (possibly leading to lumen clogging by coating polymer) are the likely reasons why the larger diameter hollow fibers give better results.

Microporous hollow fibers having nominal inside diameters of 240 microns and 100 microns are respectively available under the tradenames CELGARD(R) X-20 and CELGARD(R) X-10 from the Hoechst Celanese Corporation, Charlotte, N.C. These fibers have a wall thickness of about 30 microns.

Each fiber is a small tube with a microporous wall. The porosity of the 100 micron and 240 micron inside diameter fibers are 30% and 40%, respectively. The pores are small rectangular slits with channels extending through the fiber walls.

Once suitable microporous hollow fibers (MHF) have been selected, a module should be constructed incorporating them.

In a preferred embodiment, the glass modules are provided with two 6 mm ports each about 2 cm in length, at a point about 3 cm from each end of the module. These ports permit application of a driving force of up to about one pound per square inch, (preferably about one-half pound) across the membrane, which aids fiber wetting. It is not essential that modules having ports at the ends be used. A simple glass tube is often easier to work with. However, it may be difficult to completely fill the shell side with a polymer solution without ports.

Having completed preparation of the module, one end is then placed in a standard ¼" chromatographic fitting, which is then connected to a suitable peristaltic pump. The coating procedure described below is then carried out by pumping via the fitting.

The first step in the coating process is to make the hydrophobic membrane water-wettable. This is done by treating the fiber with a surfactant solution.

Suitable surfactants are well known to those skilled in the art, and any surfactant typically used to wet hydrophobic microporous membranes can be used. Particularly preferred is a solution of TWEEN(R) 60, water and methanol.

The surfactant solution is then pumped into the module and through the lumens to wet the fibers. The pumping rate should be moderate, say about one milliliter per minute (ml/min) and preferably about 3ml/min. The pumping is continued until the solution completely wets the fibers and fills both ports.

Next, the module is prepared for the polymer coating process. The surfactant solution is drained from the shell side, and the module is dried. Drying can be carried out in any suitable manner, preferably by either air drying for say, 15-20 hours or by placing the module in a vacuum oven.

The polymer solution consists of polyvinyl alcohol (PVA), divinyl sulfone (DVS) and water. The solution is mostly distilled water, because a dilute solution is essential in order to facilitate rapid diffusion into the lumen pores. The use of distilled water rather than, e.g. tap water, is preferred but not essential. Preferably, the water constitutes at least about 85% of the solution, more preferably at least about 90%, and most preferably about 93.3%.

Although the discussion herein is directed to PVA/DVS gel systems, it should be understood that other polyol/DVS-type gellable systems can also be used. Suitable polyol/DVS systems are disclosed, for example, in the *Handbook of Fiber Science and Technology: Volume II—Chemical Processing of Fibers and Fabrics*—Functional Finishes Part A (Ed. by Menachem Lewin et al), (Marcel Dekker, N.Y. 1983), pp. 23-28, which is hereby incorporated by reference. Of particular interest is the disclosure in this reference of cellulosic materials treated with divinyl sulfone and divinyl sulfone precursors. Most broadly, the coating compositions of this invention are made up from at least one polyol, such as, but not limited to, PVA or the polyols disclosed in the above-referenced Handbook, combined with divinyl sulfone and/or one or more divinyl sulfone precursors as also disclosed in the Handbook.

The PVA and DVS must be suitably selected to result in a gel to fill the substrate membrane pores. Generally, the PVA should have a sufficiently high average molecular weight to facilitate gelation; and low enough to avoid clogging the lumens of the hollow fibers. For hollow fibers having particularly small lumens, the PVA should have a relatively low average molecular weight. Concurrently, as the molecular weight of the PVA decreases, the concentration of DVS employed should be accordingly increased. The resulting polymer should have a sufficiently high molecular weight to facilitate entanglement of the polymer in the pores of the substrate membrane, yet low enough so that the polymer can swell into a gel. Those skilled in the art will appreciate that these parameters may need to be adjusted in particular cases to result in an effective gel.

The PVA should generally be characterized by an average molecular weight of at least about 5,000 and not more than about 100,000; preferably the PVA has a molecular weight ranging from about 10,000 to about 100,000, and most preferably from about 10,000-30,000 Daltons. PVA is often obtained by hydrolyzing polyvinyl acetate. For the purposes of this invention, the PVA should be at least 85% hydrolyzed, preferably at least 95%, and most preferably at least 98%. A suitable product is AIRVOL 107, which is commercially available from Air Products and Chemicals Inc.

The PVA should generally constitute about 5 to about 15%, preferably about 5 to about 10%, and most preferably about 5.6% of the solution.

Divinyl sulfone is a standard item of commerce. It should generally constitute about 1 to about 5%, preferably about 1 to about 2%, and most preferably about 1.1% of the solution.

The proportions of PVA and DVS should be adjusted to yield the appropriate percentage of unreacted alcohol groups on the polymer. Preferably, about 90%, and most preferably about 93% of the alcohol groups should remain unreacted.

The polymer solution is mixed and then pumped through the lumens of the hollow fibers. The pumping rate should generally be moderate, say, about 0.1 to about 10ml per minute, preferably about 0.1 to about 1 ml per minute. The polymer solution is pumped through the lumens until the fibers are completely wetted and both ports are filled. At this point it is convenient to cap the ports, e.g. with standard ¼" SWAGELOK caps.

Clearing the excess polymer solution from the lumens is critically important. The polymer must be removed from the lumens without washing it out of the lumen pores. This is accomplished by passing distilled water through the module at a low flow rate, generally about 0.1 to about 1 ml per minute, preferably about 0.5ml per minute, until the viscosity of the elutant decreases. This change in viscosity can be readily observed by the naked eye because the polymer solution is several times more viscous than water, and therefore flows more slowly. Also, the polymer solution is light yellow in color. The displacement of the excess polymer generally takes about 2-4 minutes. Typically a volume of water equal to about half the volume of the lumen should be employed.

Crosslinking of the PVA/DVS is then achieved by introduction of a catalyst. A basic solution is passed through the lumens at a moderately heated temperature. Preferably, sodium hydroxide (NaOH) is employed. The base should generally be heated to about 40-60 degrees centigrade, preferably about 50 to 60 degrees, and most preferably to about 55 degrees centigrade. A particularly preferred solution consists of 80% distilled water and 20% NaOH. As will be readily understood by those skilled in the art, other catalyst systems may be used, and heating to aid the crosslinking reaction may not be necessary. In particular, systems employing DVS as the crosslinking agent may not require heating and/or a catalyst.

The catalyst solution is pumped into the fiber lumens, at a low flow rate, generally about 0.1 to 10 ml per minute, preferably about 0.1 to 1 ml per minute, and most preferably about 0.5 ml per minute. The gel begins to form within seconds after applying the base, turning the fibers a light yellow. The base is circulated for several minutes, generally about 3-4 minutes. The gelation occurs by a Michael's addition reaction (see FIG. 1).

The module is then washed with distilled water. For the modules described here, about 2 liters is sufficient. The flow rate should be moderate, say about 1 to about 10 ml per minute, preferably about 2 ml per minute. The fibers lose their yellow color soon after the washing begins. In order to completely clear the lumen, it is helpful to run the washing at a high flow rate near the end, say, about 8 ml per minute.

The resulting module is characterized by pores which are filled with a PVA/DVS aqueous gel. The structure of the gel is shown in FIG. 1.

In use, the hollow fiber modules of the invention are first charged with a solution to be separated. The solution is generally charged under pressure, in order to maximize the transport rate of the solution through the lumens of the hollow fibers.

The modules can be used either singly or in parallel. Parallel operation permits increased total throughput without the problem of increased pressure drop.

The pore-filled microporous hollow fiber membrane modules of the invention can be used in a broad range of chromatographic separations applications, including both differential migration for small molecules (e.g., liquid-liquid extractions), and affinity adsorption for charged species, particularly proteins and enzymes. The pore-filled hollow fibers constitute stabilized, immobilized liquid membranes having utility generally where such membranes are needed. The stability of the immobilized membranes permit operation at high pressures without resultant bleed-out of the immobilized liquid membrane, yet without reduced flow rates, because diffusion migration of the mobile phase is not hindered.

While the invention has been described only in connection with hollow fibers, the pore-filling process could also be applied to other forms of microporous membranes, particularly flat sheet membranes.

EXAMPLE 1

Microporous hollow fibers (CELGARD(R) X-20) were potted in glass tubes using an epoxy resin. Two tubes, 20 cm and 60 cm in length, respectively, were employed. The tubes each had an outer diameter of ¼", and included two ports having outer diameters of 60 mm placed approximately 1¼" from each end. After the epoxy was cured, one end of each glass module was placed in a standard ¼" chromatographic fitting, in this case a Valco fitting. The fitting was connected to a peristaltic pump.

A solution was prepared consisting of one gram of TWEEN(R) 60, a commercially-available polyoxyethylenesorbitan, 40ml distilled water, and 60ml of methanol. The solution was pumped into the modules and through the lumens of the fibers at a rate of about 3ml per minute, wetting the fibers almost immediately. The pumping was continued until the solution completely wet the fibers and filled both ports. The solution was then drained from the shell side, and air was passed through the module for 15-20 hours to dry the module.

Next, a polymer solution (100 ml) was prepared consisting of 93.3% distilled water, 5.6% polyvinyl alcohol (Airvol 107, average molecular weight 10,000-30,000; 98% hydrolyzed from polyvinyl acetate) and 1.1% divinyl sulfone (all percentages by weight). This solution was then pumped through the fiber lumens until the fibers were completely wetted and both ports were full.

Caps (¼" Valco) were placed on the ports and hand tightened.

Distilled water was then pumped through the modules at a flow rate of about 0.5ml per minute until the polymer solution was displaced from the lumens. This took about 2-4 minutes.

A solution consisting of 20% NaOH and 80% distilled water (by weight) was prepared (100 ml), heated to 55 degrees centigrade and pumped through the fiber lumens at a rate of about 0.5 ml per minute. The fibers turned a light yellow, indicating the formation of a gel. Pumping of the base continued for 3-4 minutes.

The modules were then washed by passing about 2 liters of distilled water through the lumens at about 2.0 ml per minute. The fibers lost the yellow color after about 20 ml of this washing. In order to completely clear the lumens, the washing was run at a high flow rate (about 8 ml per minute) for the last hour of washing.

EXAMPLE 2

Figure 2:
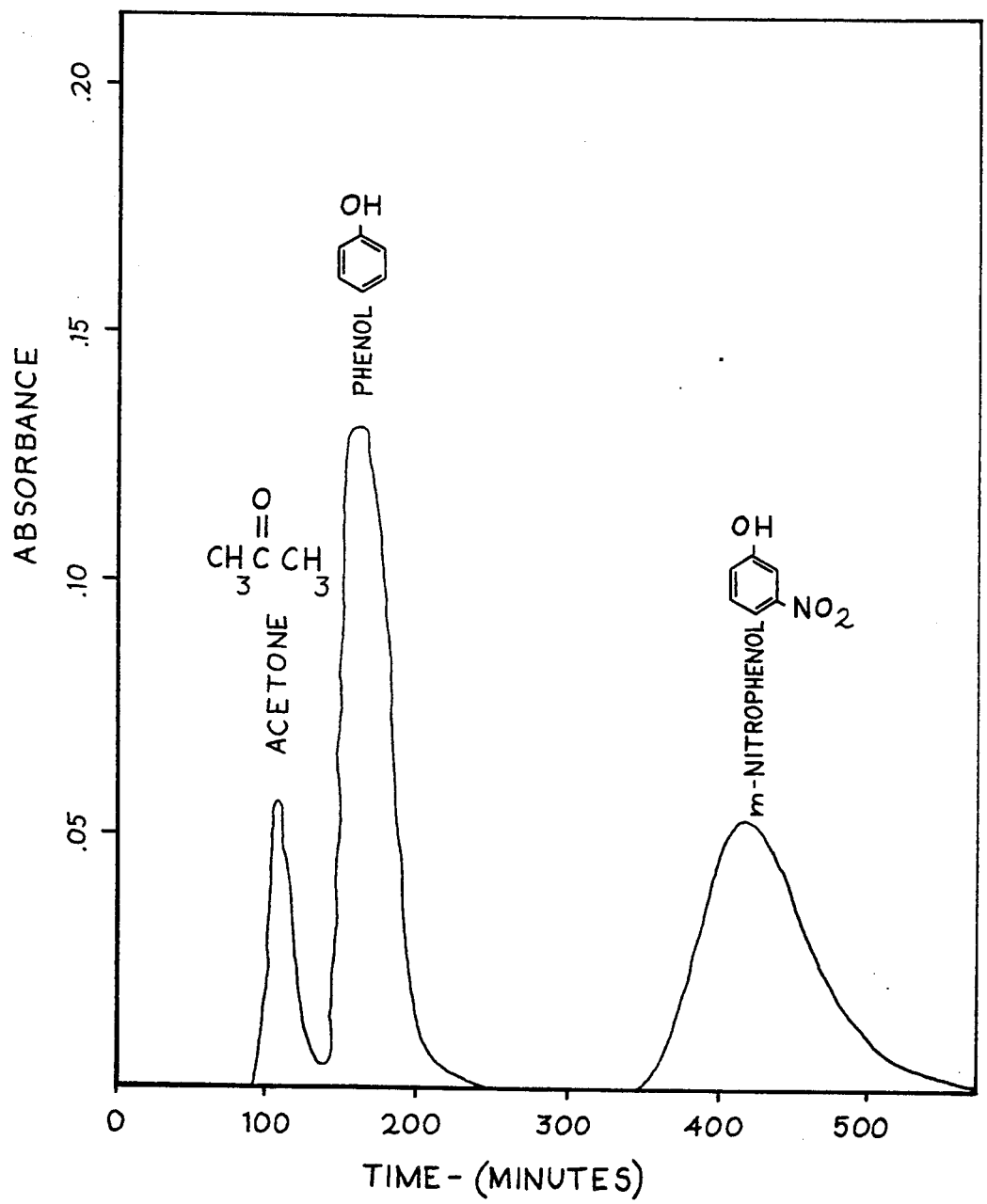
FIG. 2 illustrates the apparatus used in Example 2 to assess the performance of the gel-filled microporous membrane modules.

An experimental system used to evaluate the performance of the modules prepared in Example 1 is schematically shown in FIG. 2. An aqueous solution of several solutes is prepared in parts by weight. The amount of total solutes to be injected into the module is kept well below overload conditions, by preparing a dilute solution and by using injection volumes of 10-20 microliters. An injection valve is primed with sample solution and the solution to be separated is then pumped into the module. The solution (mobile phase) travels through the hollow fiber lumens and into a UV-visible light detector, which sends a voltage signal to an integrator. The detector normally uses wavelength settings of 254 nanometers for all solutes except ketones, which are measured at 265 nanometers. The resulting data are equivalent to concentration readings. The integrator stores the signal as a function of elapsed time. In these trials, a SpectraPhysics Isochrom pump, a Scientific Systems Inc. pulse dampener (model LP-21), a Milton-Roy Variable Wavelength Detector (model 3010), a Rheodyne 7010 injection valve, and a Hewlett-Packard Integrator (model 3396A) were employed. This equipment is all standard; other equipment could readily be substituted.

Figure 3:
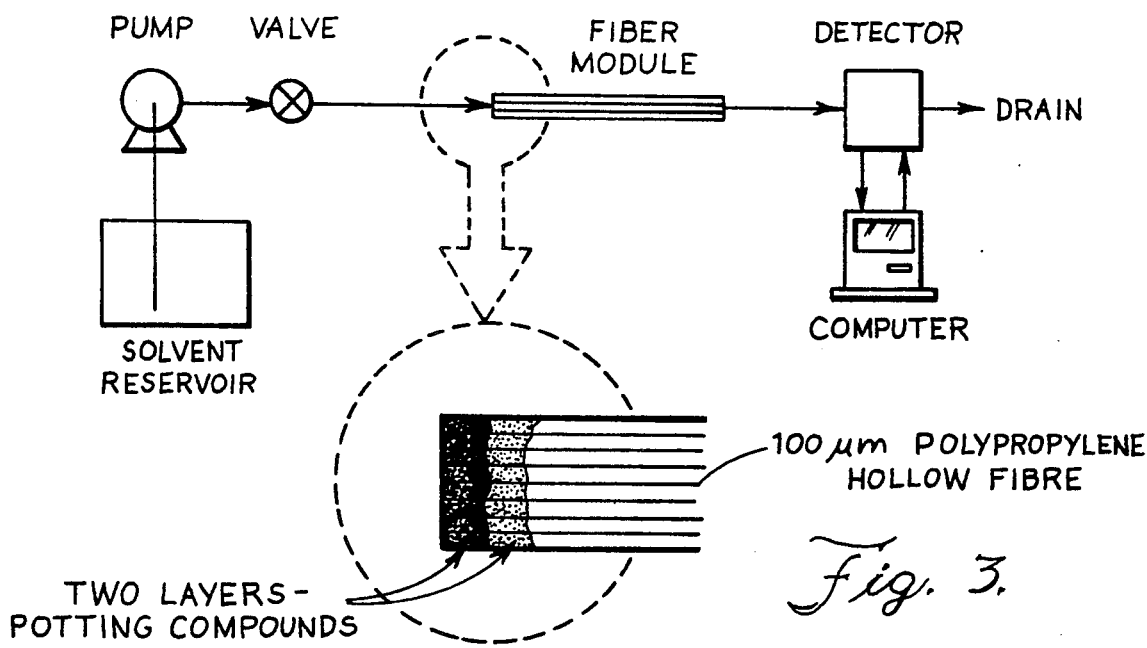
FIG. 3 illustrates resolution of a mixed solution with a gel stationary phase hollow fiber membrane.

A module 50 cm in length, containing 120 fibers having inside diameters of 240 microns and a fiber wall thickness of 25.4 microns was prepared according to Example 1 and used to separate an aqueous mixture of acetone, phenol and m-nitrophenol. The solution to be separated was passed through the fibers at a flow rate of 0.00083 cubic centimeters per second. The results are plotted in FIG. 3. As can be seen, the m-nitrophenol was completely separated from the other solution components, and the other two mixture components were substantially separated from each other.

EXAMPLE 3

Additional modules were prepared according to Example 1 and tested in the same manner described in Example 2. The results are shown in TABLE 1.

In affinity adsorption mode, separations of proteins and enzymes may be carried out by the selective binding of ligands for the respective proteins and enzymes, in the immobilized gel. The PVA gel has hydroxy groups which are available for derivatization. The ligands to be bound should preferably be inexpensive, because large amounts will be needed if preparative chromatography is to be carried out in addition to analytical chromatography (the former refers to preparation of useable quantities of a desired product).

A preferred group of ligands in the case of proteins are the triazine dyes. These are referred to as pseudoligands, since they are not natural protein-binding substances, but rather mimic the same. Triazine dyes can be attached to the PVA gel by forming an ether linkage via a hydroxy group. These dyes are suitable for large-scale affinity separations for several reasons. These dyes have a greater capacity for binding proteins than naturally-occuring ligands; they can bind anywhere from 10 to 100 times more than a true affinity ligand. The natural ligands are vastly more expensive than the dyes, which are available as commodity chemicals in large quantities and at low costs. Most importantly, however, the dyes have a propensity to bind, selectively and reversibly, a plethora of proteins. There are two kinds of triazine dyes, the Procion MX and Procion H groups. Although either can be used, the Procion MX dyes are generally more reactive with the hydroxy groups of the gel, making application of heat less necessary and possibly avoidable in binding the dye to the gel.

The triazine dyes are particularly effective in the purification of pyridine nucleotide-dependent dehydrogenases, kinases, coenzyme A-dependent enzymes, hydrolases, acetyl-, phosphoribosyl-, and amino-transferases, RNA and DNA nucleases, decarboxylases, sulfohydrolases, phosphorylase, myosin, serum albumin, clotting factors, lipoproteins, complement proteins, and interferon.

The following Example demonstrates suitable procedures for binding a triazine dye psuedo-ligand onto a PVA gel immobilized in hollow fibers.

EXAMPLE 4

Hollow fibers having a PVA/DVS gel immobilized in the pores were prepared as in Example 1. A solution consisting of 0.6 grams of Reactive Blue 4 (Sigma Chemicals, R-9003) containing approximately 40% of the Procion MX-R dye was dissolved in 40 ml of distilled water and 20 ml of a 4 molar sodium hydroxide solution. After dissolution of the dye, 0.5 ml of an aqueous 20% by weight sodium hydroxide solution was added to the mixture. This solution was immediately pumped into the module in order to avoid hydrolysis of the chloro groups by the base. The module employed was 60 cm in length containing 132 hollow fibers with nominal inside diameters of 240 microns. This module had a lumen volume of 3.6 cubic centimeters. The solution was pumped through the module for 15 minutes at a rate of 0.3 ml per minute. Flow was halted, and the module was capped at the ends. After the module sat for two hours, distilled water was passed through the module until the module effluent was no longer blue (usually about 1 liter). The above procedure was repeated in order to ensure adequate dye coverage on the gel. The fibers were then washed copiously and sequentially with (1) water; (2) 1 molar sodium hydroxide/25% ethanol; (3) water; (4) 1 molar sodium hydroxide/0.2 molar phosphate, pH 7.0; (5) water. Inspection of the module showed a uniform blue color in the hollow fibers. At this point the module was ready to perform affinity separations.

In using a module prepared as above for affinity chromatographic separations, four distinct steps are involved. First, the solution to be separated is injected into a noneluting buffer and carried into the hollow fibers. The solutes in the solution that "recognize" the affinity ligand are bound to the gel. Second, inert or weakly-retained species are removed by passing a noneluting buffer through the hollow fibers. Third, the elution is carried out by changing the composition of the mobile phase. While the binding of the solute to the ligand is reversible, the elution can only occur by changing some property of the mobile phase. It is convenient to install a valve upstream of the hollow fiber module which will allow selection of several different mobile phase compositions. Fourth, the module must then be returned to its initial condition before another solution is injected.

Five ways of changing the mobile phase are as follows: changing the pH, increasing the ionic strength, adding a chaotropic agent, adding organic solvents, or adding a competing biologically specific ligand. Sometimes combinations of these changes are necessary to elute the solute. The most selective method is the addition of competing ligands.

The following Example shows the utility of a typical module for both differential adsorption and affinity chromatography:

EXAMPLE 5

A module is prepared containing 82,500 hollow fibers having pores filled with PVA/DVS gel prepared and deposited as in Example 1. In this module, the cross-sectional area will be about 100 square centimeters (or a column diameter of about 10 centimeters). This module design will allow for the isolation of two low molecular weight solutes ( molecular weight less than 500 ), at a throughput of approximately 37 grams per day for each solute where the selectivity of the separation arises from differential absorption/desorption and the differences in partitioning between the solutes is a factor of 2. The same device, with an immobilized triazine dye in the gel, isolates approximately 175 grams of bovine serum albumin per day when operated in the affinity mode.

The use of hollow fibers to carry out liquid-liquid extractions is disclosed in Sirkar U.S. Pat. No. 4,789,468, the entirety of which is hereby incorporated by reference. That patent discloses the application of static pressure to maintain the interface between the two liquid phases at the membrane. Such procedures can be inconvenient, especially in large modules where the pressure drop in the module may be as big as the static pressure difference. Additionally, surface active species may, despite the static pressure, enter and "wet out" the membrane, resulting in a compromised extraction. By using the hollow fibers of this invention having gel-filled pores, these problems are avoided because the gel prevents either the feed or extractant liquid/phases from entering the hollow fiber substrate membranes.

The gel-filled hollow fiber membranes can also be used to carry out gas separations. In contrast, for example, to glassy polymers such as modified or unmodified polycarbonates or polyimides, the gelled polymers of the invention provide a matrix having a higher diffusion rate, resulting in more rapid and higher volume gas separations. Particular gel-forming materials within the scope of the above discussion may be selected by those skilled in the art for particular separations applications.

While the invention has been described in connection with what are presently considered to be the most practical and preferred embodiments, it is to be understood that the invention is not limited to the preferred embodiments, but rather is intended to cover various modifications and equivalents included within the spirit and scope of the appended claims.

TABLE 1

RESULTS WITH PVA GEL STATIONARY PHASE

| MODULE[1] | SOLUTE | A[2] | B[3] | C[4] | D[5] |
|---|---|---|---|---|---|
| | | s | s | s$^2$ | |
| 196/100/37.0 | phenol | 690 | 4,220 | 420,000 | 5.11 |
| | | 1,380 | 8,310 | 1,060,000 | 5.03 |
| | acetone | 690 | 1,932 | 118,000 | 1.80 |
| | | 1,380 | 4,000 | 371,000 | 1.90 |
| 120/240/51.5 | phenol | 696 | 1,956 | 96,800 | 1.82 |
| | | 3,468 | 10,020 | 745,000 | 1.89 |
| | m-nitrophenol | 696 | 4,950 | 648,000 | 6.13 |
| | | 3,468 | 24,840 | 4,640,000 | 6.16 |
| | acetone | 696 | 1,278 | 34,560 | 0.85 |
| | | 3,468 | 6,612 | 252,000 | 0.91 |
| | 2-pentanone | 696 | 1,346 | 48,600 | 0.95 |
| | | 3,468 | 6,954 | 337,000 | 1.00 |
| | blue dextran | 696 | 702 | 14,200 | 0.008 |
| | | 3,468 | 3,480 | 130,000 | 0.003 |
| 132/240/62.0 | phenol | 4,450 | 11,580 | 1,010,000 | 1.60 |
| | | 1,482 | 3,780 | 223,500 | 1.55 |
| | m-nitrophenol | 4,450 | 23,900 | 5,600,000 | 4.37 |
| | | 1,482 | 7,740 | 2,100,000 | 4.22 |
| | acetone | 4,450 | 8,000 | 363,000 | 0.80 |
| | | 1,482 | 2,650 | 115,000 | 0.79 |
| 120/240/21.5 | phenol | 281 | 714 | 33,200 | 1.55 |
| | m-nitrophenol | 281 | 1,550 | 184,000 | 4.51 |
| | acetone | 281 | 498 | 10,800 | 0.77 |

[1] number of fibers/nominal fiber i.d. in microns/module length in cm.
[2] mean residence time of the mobile phase
[3] average solute residence time
[4] column variance
[5] capacity factor

We claim:

1. A method of modifying a hydrophobic microporous membrane, by providing a stabilized gelled liquid membrane immobilized in the pores of a microporous membrane having properties for enabling separations at high pressure drops across the membrane while substantially precluding loss of the liquid membrane by rejection from the microporous matrix, comprising the steps of:
   (a) treating the membrane with a surfactant;
   (b) draining excess surfactant from the membrane;
   (c) drying the membrane;
   (d) preparing an aqueous solution of at least one polyol and at least one compound selected from the group consisting of divinyl sulfone and divinyl sulfone precursors;
   (e) treating the membrane with the aqueous solution;
   (f) removing aqueous solution from the exterior of the membrane by washing the membrane with water;
   (g) crosslinking the aqueous solution in the pores of the membrane; and
   (h) washing the membrane with water, to yield a hydrophilic membrane having pores filled with a water-soluble gel sufficient to provide said properties.

2. The method of claim 1 in which the membrane is a hollow fiber having a lumen and the exterior of the membrane includes the lumen.

3. A module comprising a housing and a plurality of hollow fibers according to claim 2.

4. In a method of carrying out affinity chromatography, the improvement comprising employing hollow fibers according to claim 2.

5. The method of claim 4, in which, after step (h), a triazine dye is pumped through the hollow fibers.

6. In a method of carrying out liquid-liquid extraction, the improvement comprising employing hollow fibers according to claim 2.

7. In a method of carrying out gas separation using hollow fibers, the improvement comprising employing hollow fibers according to claim 2.

8. The method of claim 2 in which the aqueous solution is pumped through the lumens of the hollow fibers at a pumping rate between about 0.1 to about 10 milliliters per minute.

9. The method of claim 2 in which the aqueous solution is removed from the lumens of the hollow fiber membrane by pumping water through the lumens of the hollow fiber at a pumping rate between about 0.1 to about 1 milliliter per minute.

10. The method of claim 2 in which the crosslinking is catalyzed by treatment with a base, and in which the base is pumped through the lumens of the hollow fibers at a pumping rate between about 0.1 to about 10 milliliters per minute.

11. The method of claim 1 in which the polyol is polyvinyl alcohol.

12. The method of claim 1 in which the aqueous solution comprises polyvinyl alcohol and divinyl sulfone.

13. The method of claim 12 in which the average molecular weight of the polyvinyl alcohol is in the range of from about 5,000 to about 100,000 Daltons.

14. The method of claim 12 in which the polyvinyl alcohol is at least about 85% hydrolyzed from polyvinyl acetate.

15. The method of claim 12 in which the polyvinyl alcohol constitutes about 5 to about 15 percent of the aqueous solution and the divinyl sulfone constitutes about 1 to about 5 percent of the aqueous solution, by weight.

16. The method of claim 1 in which the crosslinking is catalyzed by treatment with a base.

17. The method of claim 1 in which the crosslinking is catalyzed by treatment with heat.

18. A membrane produced by the method of claim 1.

* * * * *